United States Patent [19]
van Kempen

[11] 3,929,553
[45] Dec. 30, 1975

[54] FILM SLEEVING APPARATUS

[75] Inventor: Charles van Kempen, Haworth, N.J.

[73] Assignee: Simplex Specialty Co., Inc., Hackensack, N.J.

[22] Filed: Sept. 13, 1974

[21] Appl. No.: 505,866

[52] U.S. Cl. ............... 156/391; 156/554; 156/555; 156/582; 156/583
[51] Int. Cl.² .................... B29C 27/02; B30B 15/34
[58] Field of Search .......... 156/555, 582, 554, 391, 156/364, 361; 83/827–829; 144/253

[56] References Cited
UNITED STATES PATENTS

| | | | |
|---|---|---|---|
| 1,758,834 | 5/1930 | Heston et al. | 144/253 F |
| 2,488,355 | 11/1949 | Wagner | 156/361 |
| 3,109,764 | 11/1963 | Natelli | 156/582 |
| 3,455,768 | 7/1969 | Niemeyer | 156/582 |
| 3,484,325 | 12/1969 | Pendleton | 156/582 |
| 3,669,802 | 6/1972 | Feldkamper | 156/555 X |
| 3,737,359 | 6/1973 | Levitan | 156/555 |

*Primary Examiner*—Douglas J. Drummond
*Assistant Examiner*—M. G. Wityshyn
*Attorney, Agent, or Firm*—Samuelson & Jacob

[57] ABSTRACT

A sleeving apparatus for enclosing a web of photographic film between layers of plastic foil has feeding apparatus and sealing apparatus which can be adjusted for various widths of photographic film web to be sleeved by the device. Additionally, means are provided for automatically starting and stopping the device with the introduction of photograph webs to be sleeved.

7 Claims, 6 Drawing Figures

FILM SLEEVING APPARATUS

This invention relates to photographic processing equipment and, more particularly, to equipment used for enclosing lengths of processed photographic film in clear plastic foil to protect the photographic film. More particularly, the invention relates to devices of this type which are easy to adjust to various widths of the film to be sleeved.

There are many advantages derived from enclosing processed photographic film between protective foil layers, a process known as sleeving. Sleeving protects the surface of the processed film from scratches, abrasion, dust and other environmental hazards. The presence of the thin protective foil sleeving does not adversely affect any of the subsequent procedures undergone by the processed photographic film and makes subsequent handling of the processed film much easier.

A sleeving procedure that has been used in the past has been to heat-seal thin layers of foil placed above and below the length of web or processed photographic film beyond the sides of the film to form the sleeve for the film. The foils must be wider than the film to preclude injury to the film during sleeving. However, it has been found that the sleeving of processed photographic film has presented many problems because apparatus was not available which could conveniently handle wide ranges of sizes of photographic film.

Since commercial photo-processing laboratories must handle film used in various sizes and types of cameras, it is important that the processing laboratories have the capacity to sleeve the various sizes of films normally encountered. In the past, in order to accommodate the wide range of film sizes encountered, it has been necessary to either have separate apparatuses to sleeve the films of different sizes and to handle the sleeving material of different widths or else the apparatus that was provided was cumbersome and difficult to change from film and sleeve material of one size to film and sleeve material of another size.

Further, because the sleeving process involves the heat-sealing of the plastic webs, the presence of exposed high temperature surfaces in a photographic laboratory provides a distinct hazard and is to be avoided as much as possible.

Additionally, the heat-sealing machines for sleeving photographic film must be easy to operate, since very often they will be operated by operators wearing gloves or will be used under other less than ideal conditions. Further, sleeving devices should be made of rugged construction to be relatively durable, as reliability is an important factor in any commercial operation.

To overcome the problems inherent in providing apparatus for sleeving of photographic film, the present invention is directed toward providing a heat-sealing device having a feed section and a heat-sealing section which are capable of easily accomplished, coordinated size adjustment, that enables the apparatus to form sleeves of thin plastic foil about processed photographic film of various sizes by a rapid and efficient heat-sealing operation. The device includes a switching mechanism which automatically starts and stops the film transport through the device, so that the device can be operated with a minimum of attention by the operator.

Accordingly, in view of the above, it is an object of the present invention to provide a reliable, durable, and relatively inexpensive device to produce and to operate, which can perform sleeving operations on processed photographic film.

Another object of the present invention is to provide apparatus for sleeving photographic film which has flexible operating characteristics, is easy to operate and can be automatically started and shut off by the introduction and exit of processed photographic film in the apparatus.

Yet another object of the present invention is to provide an apparatus for sleeving processed photographic film which can accommodate a wide range of film and sleeving material sizes and which can be easily adjusted from one size to another and in which the sizes for the feed tray and the actual heat-sealing implement of the device can be easily and quickly coordinated.

Still another object of the present invention is to provide apparatus for sleeving processed photographic film, having a heat-sealing implement which is designed so that it cannot accidentally mar any processed film to be sleeved, and which can be adjusted easily without extensive dismantling of the apparatus.

Another object of the present invention is to provide apparatus for sleeving processed photographic film in which the apparatus necessary for supporting the heat-sealing element is separate from the apparatus for heating the heat-sealing element so that unnecessary loads or burdens and high operating temperatures are not placed upon the mechanical structure of the device.

Yet another object of the present invention is to provide apparatus for sleeving processed photographic film which does not require movement or exposure of electrical heating elements during normal operation of the apparatus.

Other objects, advantages, features and uses will be apparent from the following description when taken in conjunction with the accompanying drawing, wherein.

Figure 1:
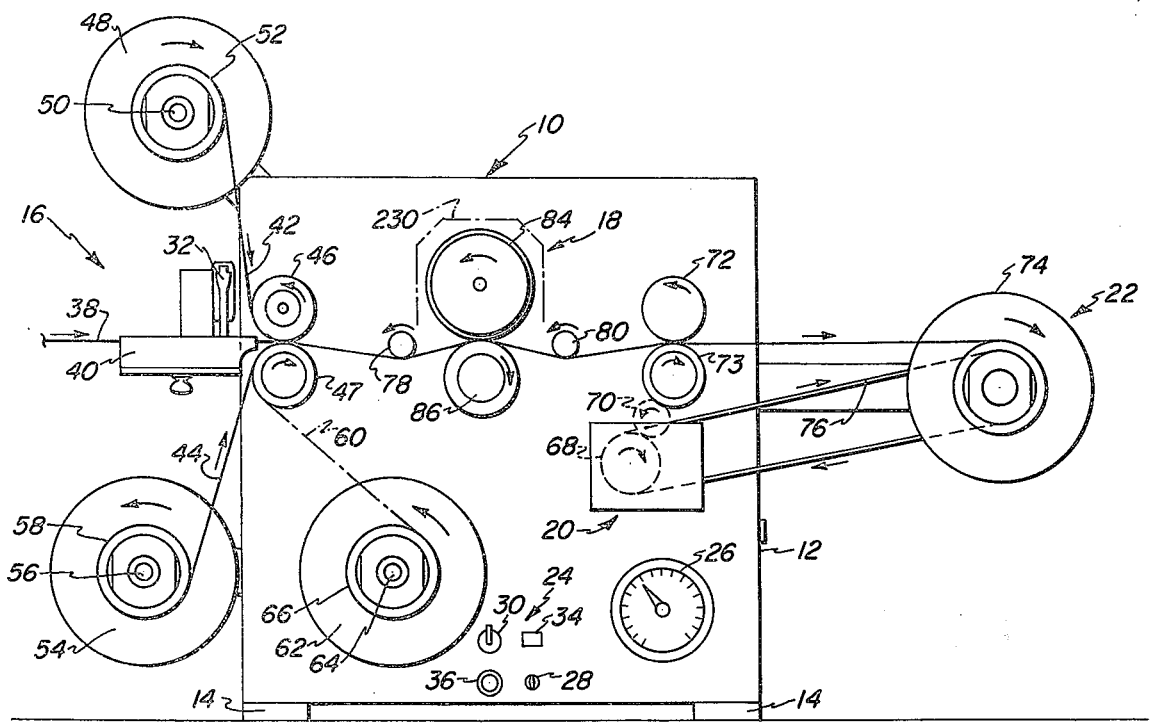
FIG. 1 is front view of a preferred embodiment of sleeving machine of the invention.

The sleeving apparatus generally indicated at 10 in FIG. 1, has a housing 12 supported by feet 14 and consists of a feed station, generally indicated at 16, from which material is drawn through a sealing station, generally indicated at 18, by a drive station 20 and stored in a take-up station, generally indicated at 22. The sleeving apparatus has a group of controls generally indicated at 24 consisting of a thermometer gauge control 26, a temperature control 28, a main switch 30, a reverse switch 34, a fuse 36 and, at the far left of the machine, a microswitch 32 the function of which will be explained in detail below.

In the feed station 16, a web of film 38 to be enclosed or sleeved by the machine is fed to a feed tray 40 which in turn passes the web to and between upper and lower feed idler rollers 46 and 47, respectively. Upper foil web 42 is fed to the idler rollers 46 and 47 from a top foil reel 48 mounted on an axle 50 which supports the roll 52 of foil material, and similarly, the bottom foil web 44 is fed from a roll 58 of foil material mounted on a foil reel 54 supported by an axle 56. Additionally, a paper web 60 fed from a roll 66 of paper mounted on a reel 62 supported by an axle 64 extending from the central portion of the housing, can be fed to the feed idler rollers 46 and 47 if it is desired to include in the final product a paper edge for notations regarding the sleeved film.

After leaving the feed station 16, the film web with the upper and lower foil webs and the paper web, if desired, pass to the sealing station 18 first passing a positioning roller 78 and then contacting the heater assembly consisting of the heater roller 84 positioned directly above an anvil 86 at which location, the heater roller presses the upper and lower foil webs together to enclose or sleeve the film web. A second positioning roller 80 is located beyond the heater roller to coact with the heater roller and the first positioning roller to properly position the webs fed to the sealing station for proper sealing.

The drive station generally indicated at 20 provides the total drive power for transporting the material through the sleeving apparatus. It consists of a drive motor shown in dotted lines within the housing at 68, which rotates an idler roller 70 to drive the upper and lower drive rollers 72 and 73 respectively which draw the various webs from the feed station 16. Additionally, drive motor 68 drives the take-up reel 74 of the take-up station 72 by means of a belt drive 76 so that the sleeved film is wound up on a drum and will not interfere with operation of the machine.

Figure 3:
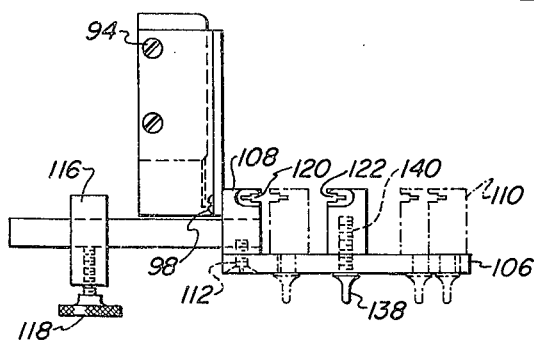
FIG. 3 is a front view of the feed tray apparatus shown in FIG. 2.
Figure 4:
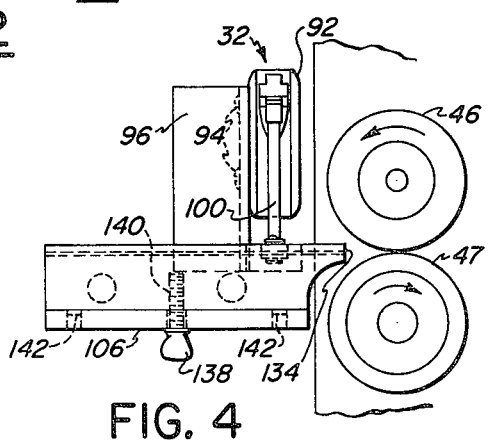
FIG. 4 is a side view of the feed tray apparatus shown in FIG. 2.

In order for the sleeving apparatus to be able to accept sizes of film of a wide size variation, it is necessary for the feed tray to be adjustable to the sizes of the film to be handled by the apparatus. The structure and operation of the feed tray is shown most clearly in FIGS. 2, 3 and 4, where the feed tray generally indicated at 40 is formed from a base 106 having two side rails 108 and 110 located inboard and outboard respectively from the housing 12 of the sleeving apparatus. The base 106 is connected rigidly to inboard side rail 108 by means of screws 112 extending through the base and into the bottom of the side rail. The feed tray is mounted by means of mounting arms 114 extending horizontally from inboard side rail 108 to a feed tray mounting bracket 116 extending from the housing 12 of the sleeving apparatus. Screw clamps 118 threadably engage the feed tray mounting bracket to bear against the feed tray mounting arms to hold the feed tray assembly rigidly with respect to the sleeving apparatus once the proper location for the inboard guide rail 108 has been determined.

The inboard and outboard side rails have guide grooves 120 and 122, respectively, with shoulders 128 and 130 respectively into which the film web is placed and supported as it is drawn through the sleeving apparatus by means of the drive rollers 72 and 73. Each of the guide grooves on each of the side rails has a flared inlet portion 124 and 126, respectively, for the left and right side rail to facilitate introducing the film web into the guide grooves. The end of each side rail, as shown best in FIG. 4, has a nozzle section 132 and 134, respectively, for the inboard and outboard side rails which extends very close to the idler feed rollers 46 and 47 to minimize the unsupported distance that the film web will have to travel.

Figure 2:
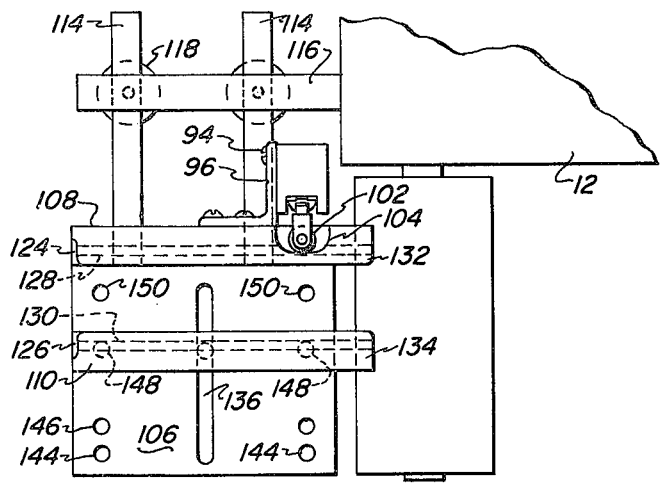
FIG. 2 is a top view of the feed tray apparatus of the sleeving machine shown in FIG. 1.

The size of film web to be handled by the feed tray assembly is determined by the position of the outboard side rail 110 which can be moved to a series of predetermined positions depending upon the film web to be sleeved. As shown in FIG. 2, the base plate 106 of the feed tray assembly 40 has an adjusting slot 136 perpendicular to the path of travel of the feed web through which extends a thumb screw 138 that has a threaded portion 140 which engages a correspondingly threaded bore in the bottom of right side rail 110. Further, a pair of pins 142 are spaced on the bottom of the side rail 110 to engage a series of positioning holes in the base 106 of the feed tray to accurately align the right side rail. As shown in the present embodiment, four sets of positioning holes are provided, the outermost set 144 is adapted to hold the widest film size, two intermediate sizes 146 and 148, and the innermost set of holes 150 positioned so that the guide slots will be properly spaced to accommodate the narrowest film web planned to be processed in the sleeving apparatus.

The feed tray assembly also contains means for automatically starting operation of the sleeving apparatus when a film web is initially fed into the tray. This is a great convenience, since it allows the operator of the apparatus to utilize both his hands for the positioning of the film web and the other webs during the start-up procedure without having to throw a switch to start or to stop the sleeving apparatus. The automatic starting and stopping apparatus comprises the microswitch 32 which has a body 92 mounted to a bracket 96 by screw 94, which bracket is in turn connected to the inboard side rail by screws 98. The arm 100 of the microswitch has a roller 102 which extends into a contacting mouth 104 formed in the rear of the right side rail. Contacting mouth 104 intersects the guide groove 120, so that when a web of film extends along guide groove 120 it will push the contact roller 102 which will automatically start the drive rollers 72 and 73 going, to start the sleeving operation. When the film web to be processed has passed through the feed tray, the contact roller 102 of the microswitch will then move to the rest position shown in FIG. 2 and thereby automatically shut off the drive mechanism of the sleeving machine.

The sealing station, generally indicated at 18 in FIG. 1, at which the upper and lower foil webs are sealed about the photographic film web, consists of the positioning rollers 78 and 80 before and after the heater roller assembly 84 and anvil 86 as previously described. The heater roller assembly is more specifically shown in FIGS. 5 and 6, and consists of a tubular heater roller generally indicated at 154 which is concentrically disposed about a tubular heating housing generally indicated at 156. The tubular heater roller 154 is mounted to a housing plate 166 by means of an axle 158 extending between the housing plate 166 and a support plate 164 on the opposite side of the tubular heater roller. The housing plate is connected to the housing 12 of the sleeving machine by mounting means generally indicated at 157. The support plate 164 is connected to the housing plate 166 by three support arms 168 having threaded ends 170 and 172 on the inboard and outboard ends respectively which extend through passages in the housing and support plates and engage bolts and washers to secure the plates with the support arms. The support arms each have shoulders 174 and 176 on the inboard and outboard ends respectively which contact the housing plate 166 and the support plate 164 respectively to insure that a proper distance is maintained between the housing plate and the support plate to allow for free rotation of the tubular heater roller 154.

Axle 158 of tubular heater 154 is supported in an axle housing 194 in the inboard end wall 192 of the tubular heater roller. The axle is positioned in the tubular heater roller by means of a positioning flange 162 on the axle which contacts a positioning shoulder 196 in the end wall of the tubular heater roller, and the axle is secured to the tubular heater roller by means of a threaded portion 161 which is tensioned by a locking nut 160 that abuts the end of the axle housing 194 of the heater roller. The inboard and outboard ends 226 and 228, respectively, of the axle 158 are journaled in bushings 188 and 190 of the housing plate and support plate, respectively, for rotation of the tubular heater roller.

The tubular heater housing 156 is held stationary and concentrically within the tubular heater roller 154 by means of a pair of screws 184 which extend through a positioning plate 178 mounted on the outside of the housing plate 164 and into bores 180 in the outboard end of the tubular heater housing 156. Mounted within the tubular heater housing are four bores 198, three of which house electrical heater elements 200 and one of which houses a thermostat 202. Corresponding passages 182 in the support register with the bores 198 of the tubular heater housing to allow for insertion and removal of the heating elements and the thermostat.

Figure 5:
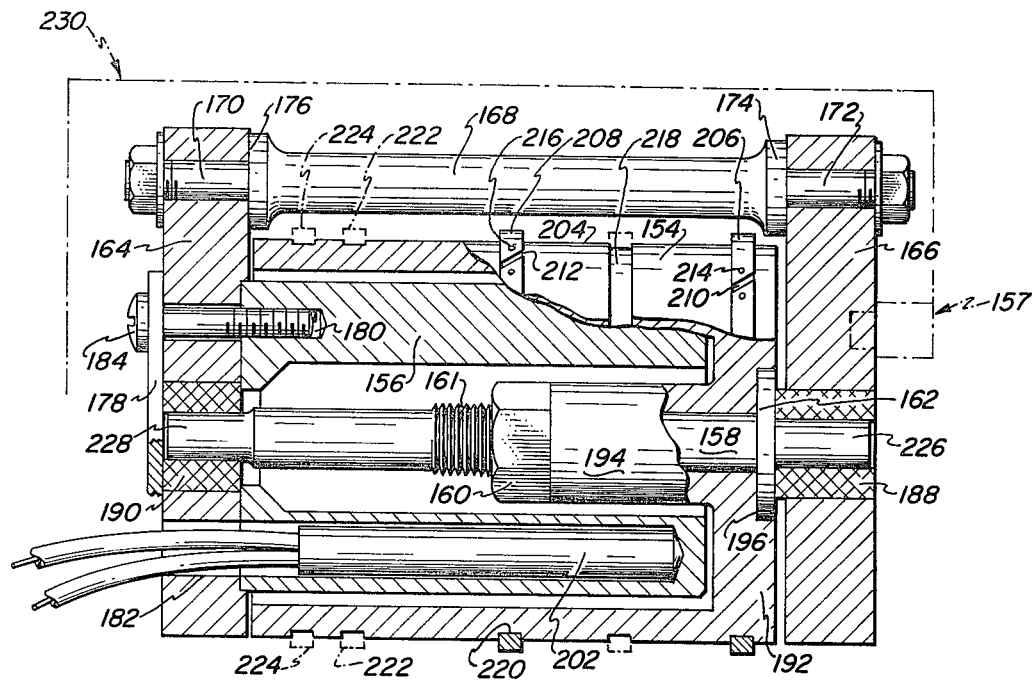
FIG. 5 is a side view, partially in section, of the heater assembly of the sleeving machine shown in FIG. 1.
Figure 6:
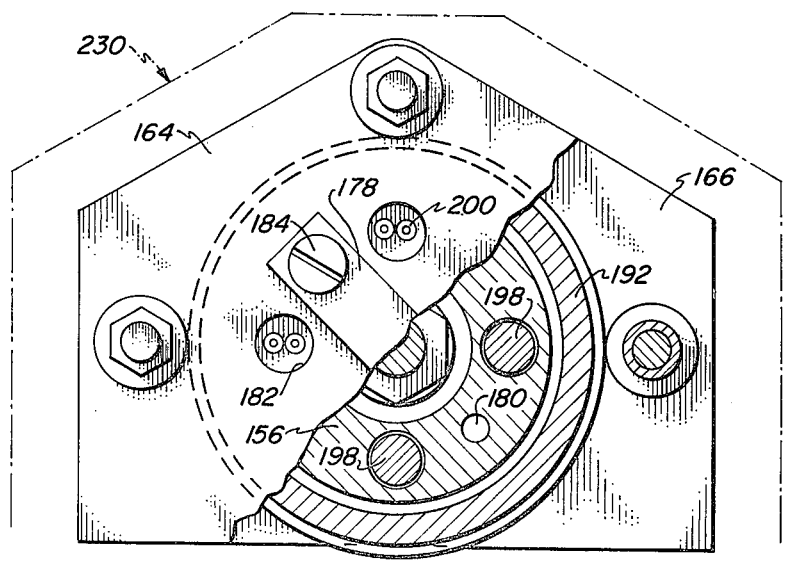
FIG. 6 is a front view, partially broken away, of the heater assembly shown in FIG. 5.

As can be seen from FIGS. 5 and 6, the circumference 204 of the tubular heater rollers 154 extends to and is even with the bottom of housing plate 166 and support plate 164.

The heater roller contacts the edges of the foil webs above and below the photographic film web to seal the upper and lower foil webs together to enclose or sleeve the film web. In order to contact only the edges of the foil webs and not contact any portion of the foil web directly over the photographic film web, the heater roller is designed so that the circumference 204 of the heater roller does not extend below the bottom of the housing plate 166 and the support plate 164. The only items that extend below the support plate and housing plate and, therefore, which can make contact with the upper web of the protective material are two snap-type heater rings 206 and 208 which are mounted inboard and outboard respectively on the circumference 204 of the tubular heater roller. The inboard heater ring 206 positioned at a location corresponding to the position of the inboard side rail of the feed tray assembly, while the outboard heater ring 208 can move to any one of four grooves positioned corresponding to the positions for the outboard side rail previously discussed. These grooves, shown in FIG. 5, are 218 for the setting of the heater ring 208 for the narrowest film size, 220 and 222 for the settings of the outboard heater ring for intermediate film sizes and 224 for the setting of the heater ring for the widest film size to be accommodated by the machine.

As mentioned previously, each heater ring is of the snaptype and has a gap 210 and 212 on the inboard and outboard heater rings respectively, and also has holes machined on either side of the gap 214 and 216 for the inboard and outboard heater rings respectively, which allow a tool having pins to be placed in the holes and moved relative to each other to widen the gap of the rings, thereby allowing either ring to be expanded circumferentially to enable it to be slid to another one of the positioning grooves on the circumference 204 of the tubular heater roller.

Operation of the device is carried on as follows. The main switch 30 is turned on, providing power to the heater elements 200 in the heater housing. The film webs 42 and 44 are fed through the inlet idler rollers 46 and 47 and then through the drive rollers 72 and 73. The operating temperature and speed of the device are set by means of the temperature control 28 and the potentiometer setting 26. The film web 38 is then fed into the feed tray 40 which actuates microswitch 32 to start the drive mechanism going and thereby draw the upper and lower foil webs through the intake idler rollers 46 and 47 drawing with them the film web 38 to the sealing station.

Either before or after the machine is turned on, the width setting of the feed tray and the corresponding heat setting of the heater rings on the tubular heater roller are set to correspond to the width of the film web which is to be processed in the sleeving machine.

When the film web between the upper and lower foil webs reaches the heater roller assembly, the heater rings fuse the upper and lower foil webs together around the film web by pressing the edges of upper and lower foil webs, which project beyond the film edges, against the anvil. At this time, any excess width of the upper and lower foil webs is also trimmed off. The temperature of the heater rings is controlled by means of the thermostat element 202 in the tubular heater housing which controls the supply of current to the heater elements 200 located in the tubular heater housing. The heat from these heater elements heats the entire tubular housing and this heat is passed through the narrow air gap to the walls of the tubular heater housing and from there is transmitted to the heater rings 206 and 208.

After the webs are fused, the sleeved film is taken up on take-up reel 74 and stored for further processing or use.

If it is desired to have a strip of paper incorporated into the sleeved photograph film web, this is done by merely feeding the web of paper 60 from the paper reel 62 along with the upper and lower foil webs 42 and 44. The paper web will then extend from the outboard end of the sleeve package and will be available for making desired notations with respect to the film which has been sleeved.

It should be pointed out that the apparatus described offers several very important advantages. The heating element is almost completely enclosed from outside access and, therefore, does not present the safety hazard that is normally presented by very hot exposed heated surfaces. A cover 230, which is shown in the dot-dashed lines in FIGS. 1, 5 and 6, is normally disposed about the support arms 168 extending from the housing plate 166 to beyond support plate 164 and down to the bottom of the housing and support plate, effectively shields the entire heater assembly. It is shown in dotdashed lines in the figures for purposes of clarity.

The heater roller assembly is of extremely rugged and durable construction and does not have any internal bearings which are subject to the high heat generated in its operation. The apparatus is very flexible in that it can process film webs of varying widths from very narrow to extremely broad. For example, the four positions of the movable heating ring may accommodate four film sizes as follows:

narrowest - 16 mm
next - 35 mm next - 60 mm next (widest) - 70 mm

Also, the inclusion of a microswitch at the inlet to the apparatus enables the operator of the device to pay all of his attention to the threading of the film webs in the device or the setting of the temperature or speed settings without having to worry about starting the machine or shutting the machine off. This being the case, there is much less waste of materials resulting from the operator's inadvertently leaving the machine on.

The machine can be adjusted for varying widths with relative ease without having to cool down the machine, by merely repositioning the outboard side rail of the feed tray and the outboard heater ring to one of the predetermined widths desired.

It should also be pointed out, that because of the rather simple and rugged construction of the apparatus, it is relatively simple to dismantle the apparatus for purposes of servicing or to replace worn parts.

It will be understood that various changes in the details, materials and arrangements of parts which have been herein described and illustrated in order to explain the nature of the invention may be made by those skilled in the art within the principle and scope of the invention, as expressed in the appended claims.

The embodiments of the invention in which am exclusive property or privilege is claimed are defined as follows:

1. Apparatus for sleeving a web of photographic film within a sleeve of foil, the web of film having a given width between opposite side edges thereof and being selected from a plurality of webs of film of different fixed given widths, said apparatus comprising:

supplying means for supplying webs of foil along a predetermined path of travel;

feed means for feeding the web of film to be sleeved into said predetermined path of travel and between the webs of foil, said feed means including guide means for accommodating film webs of any one of said different fixed given widths;

drive means for transporting the webs of foil, with the web of film therebetween, along said predetermined path of travel; and heat-sealing means for fusing the webs of foil at the side edges of the web of film, as the foil and the film move along said predetermined path of travel, to form a sleeve surrounding the web of film, said heat-sealing means comprising:

a heater roller;

means mounting said heater roller for rotation;

first and second heat rings disposed on the heater roller for engaging the foil webs at the side edges of the film web;

means for heating the heat rings so as to seal the engaged foil;

at least two annular grooves located in the circumference of the heater roller, said grooves being spaced from the first heat ring at different fixed distances corresponding to the different fixed given widths of said plurality of webs of film;

said second heat ring being selectively positionable in one of said annular grooves to match the fixed distance between the first and second heat rings to the given width of the selected web of film.

2. The invention of claim 1 wherein at least said second heat ring includes means for enabling circumferential expansion of the ring to permit release of the ring from one of said annular grooves and placement of the ring into another of said annular grooves.

3. The invention of claim 2 wherein said means for enabling circumferential expansion of the ring includes:

a gap in the ring; and engaging means at each side of the gap for receiving a tool to open the gap and thereby expand the ring.

4. The invention of claim 1 wherein said guide means includes:

a base;

first and second side rails positioned upon said base, said first side rail being located along one of the side edges of the film web; and positioning means for selectively positioning the second side rail on the base relative to the first side rail at fixed distances corresponding to the different fixed given widths of said plurality of webs of film.

5. The invention of claim 4 wherein each of said first and second rails have a guide channel for guiding a film web into said predetermined path of travel.

6. The invention of claim 4 wherein said positioning means includes:

a plurality of positioning holes in the base, said positioning holes being spaced from the first side rail at different fixed distances corresponding to the different fixed given widths of said plurality of webs of film; and at least two positioning pins extending from said second side rail to coact with said positioning holes in said base to selectively position said second side rail at any one of said fixed distances from the first side rail.

7. The invention of claim 6 including means for fastening the second side rail to the base at any selected position.

* * * * *